United States Patent [19]

Cargile

[11] 4,332,545
[45] Jun. 1, 1982

[54] CORE PIN SUPPORT AND ADJUSTING ARRANGEMENT

[75] Inventor: Harry M. Cargile, Cheshire, Mass.

[73] Assignee: Emhart Industries, Inc., Farmington, Conn.

[21] Appl. No.: 863,747

[22] Filed: Dec. 23, 1977

[51] Int. Cl.³ .......................... B29C 1/06; B29C 1/022
[52] U.S. Cl. ..................................... 425/577; 249/148
[58] Field of Search ............... 425/468, 577; 249/151, 249/147, 148, 149, 142; 164/340, 397

[56] References Cited

U.S. PATENT DOCUMENTS

| | | | |
|---|---|---|---|
| 1,167,595 | 1/1916 | Reitinger | 249/148 X |
| 1,595,494 | 8/1926 | Barnett | 425/468 X |
| 2,339,527 | 1/1944 | Thompson | 425/468 X |
| 2,688,159 | 9/1954 | Swartz et al. | 249/142 X |
| 3,524,224 | 8/1970 | Marcus | 425/577 |
| 3,608,133 | 9/1971 | Cyriax et al. | 425/577 |

FOREIGN PATENT DOCUMENTS 1263568 3/1968 Fed. Rep. of Germany ...... 249/149

*Primary Examiner*—William R. Briggs
*Attorney, Agent, or Firm*—A. W. Breiner

[57] ABSTRACT

A core pin is aligned and longitudinally positioned with respect to an associated injection mold by a support unit which has adjusting elements remote from the injection mold for adjusting the core pin in X, Y, and Z planes. The adjusting elements, in their simplest forms, are headed members lying along X, Y, and Z axes of the core pin with the threaded members being adjustably threaded into the support unit and having heads engaging flats on the core pin. The core pin is shiftable in the Z plane relative to the injection mold for example through a toggle assembly in which event the core pin is adjusted and guided in the X and Y planes by means of a guide ring which is adjustably positioned, and the toggle linkage is carried by a turn buckle permitting adjustment of the core pin in the Z plane.

23 Claims, 10 Drawing Figures

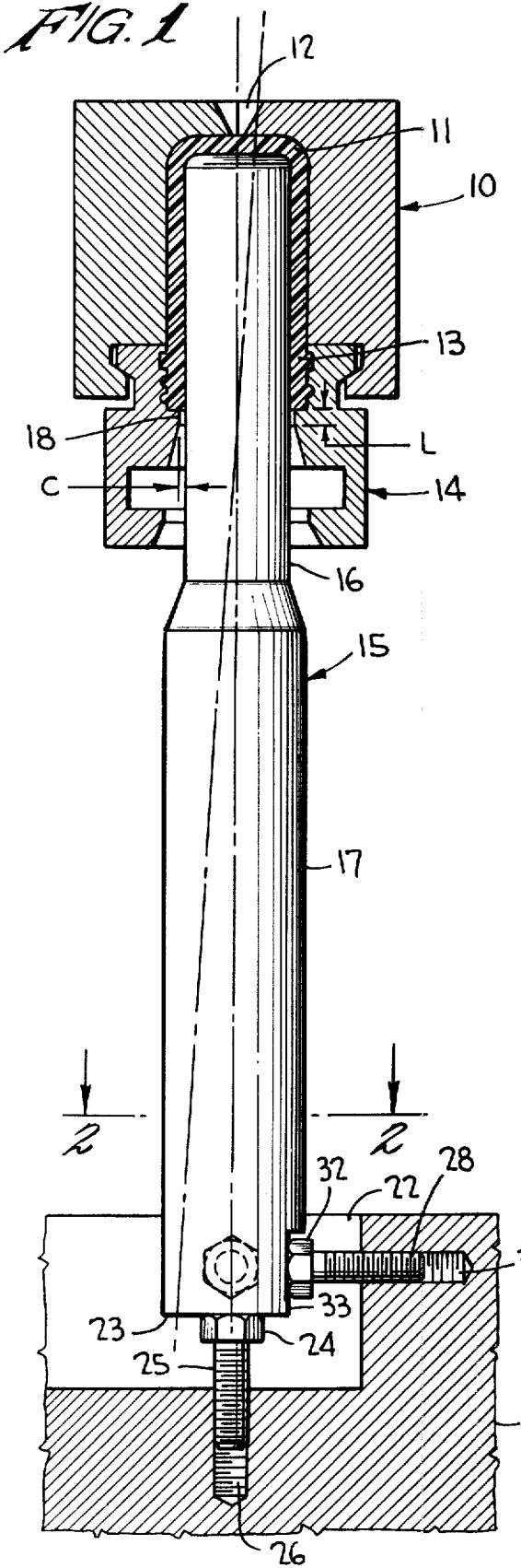
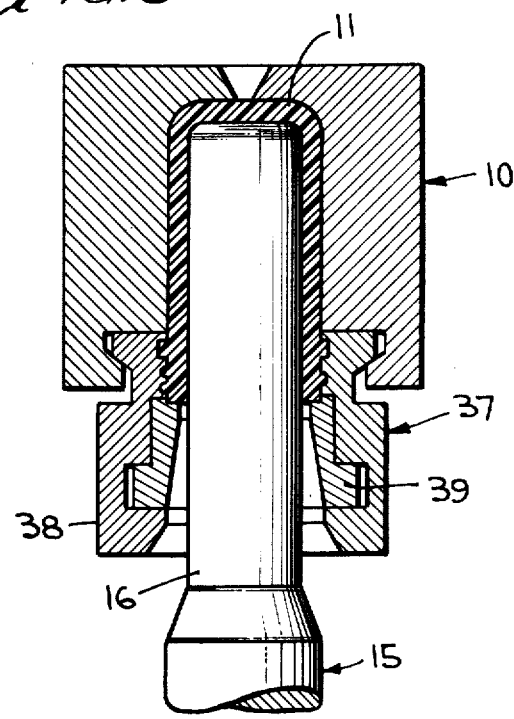
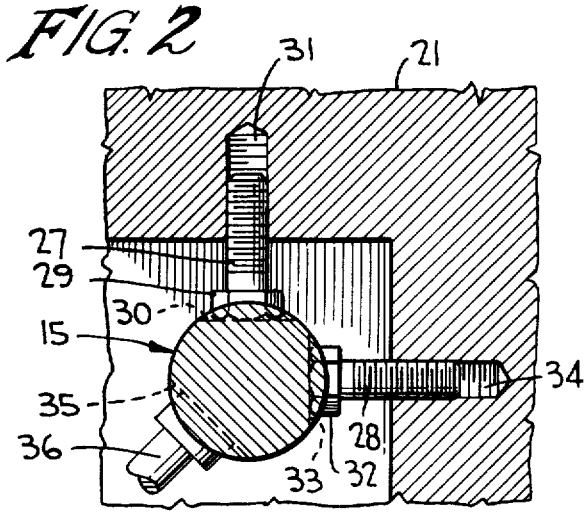
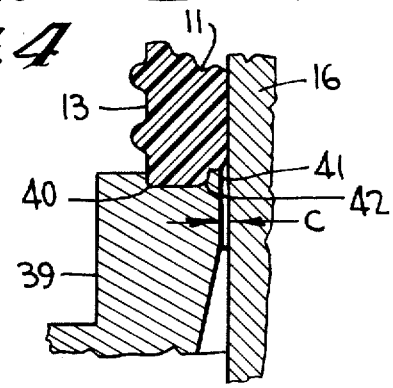

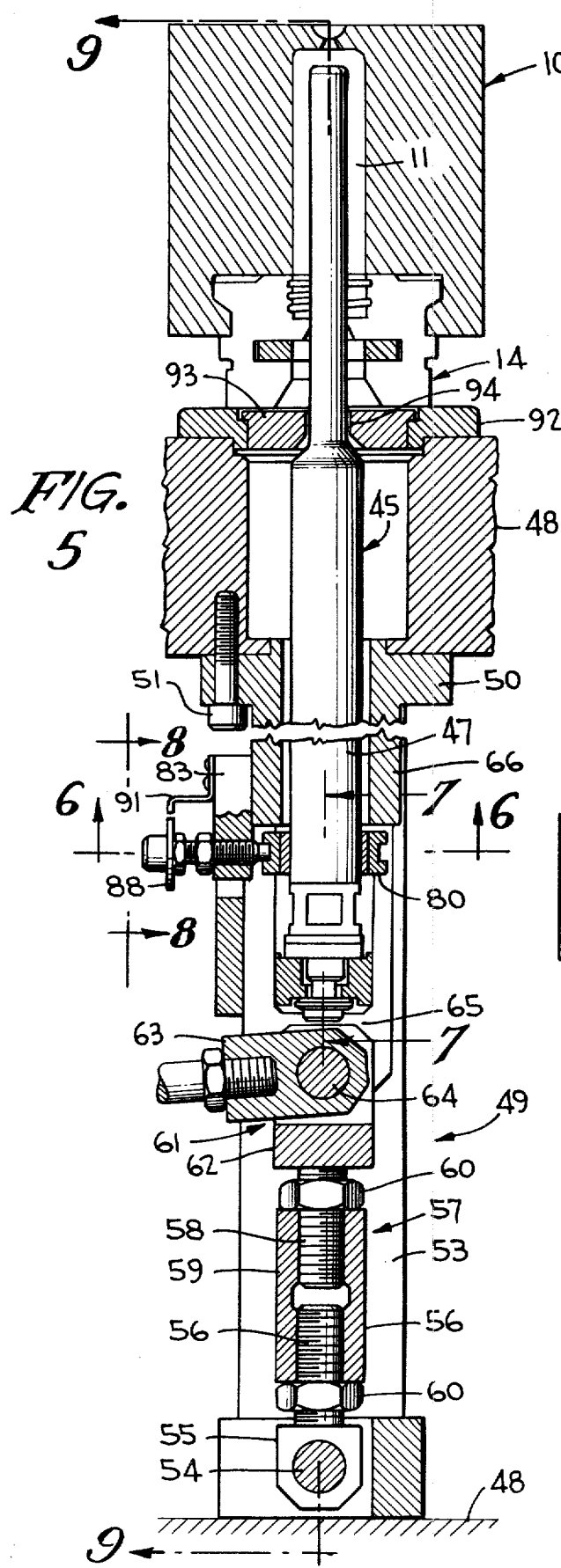
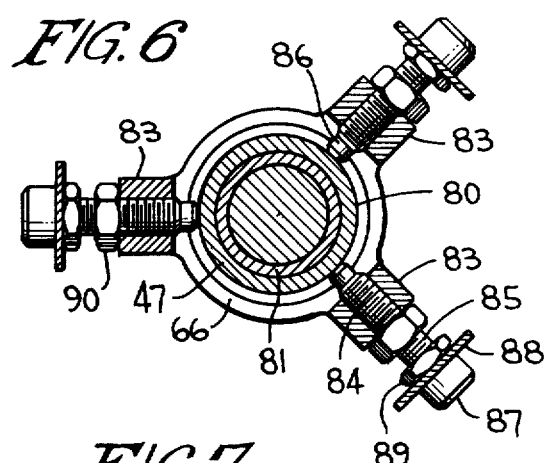
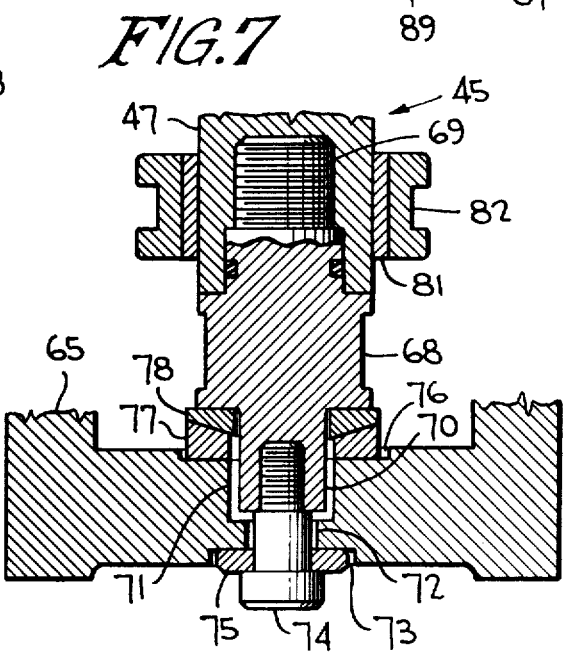
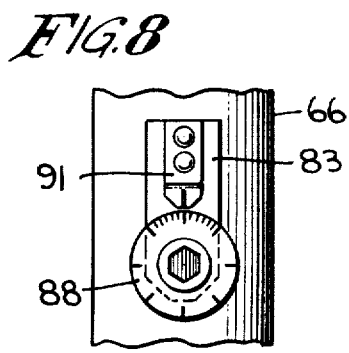

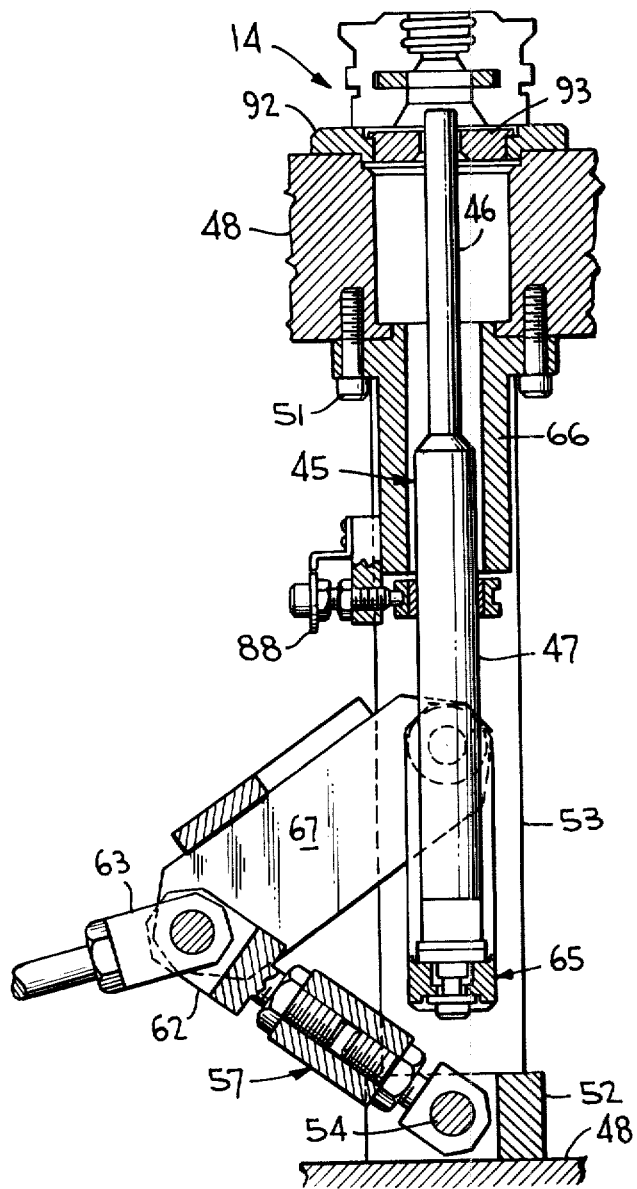
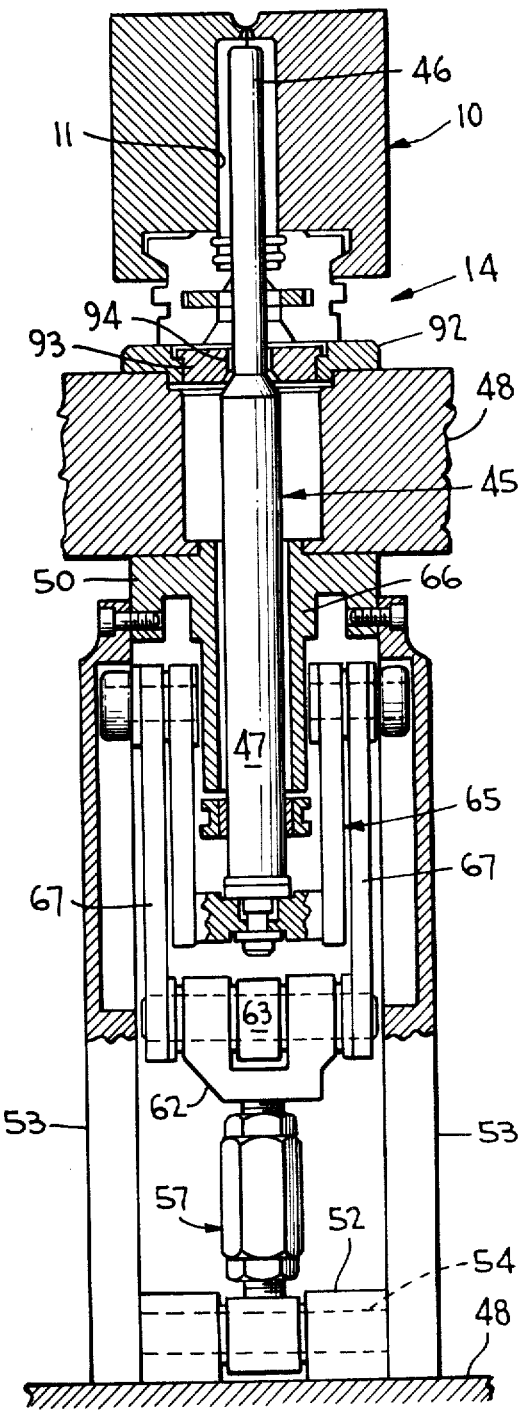

CORE PIN SUPPORT AND ADJUSTING ARRANGEMENT

This invention relates in general to new and useful improvements in the injection molding art wherein articles formed of plastics materials, normally parisons, are formed in an injection mold about a core pin.

When an article is formed in an injection mold about a core pin, it is necessary that the core pin be accurately positioned with respect to the mold in that the core pin functions through its close association with the neck of the mold to form a seal with the mold. Further, the spacing of the core pin from the bottom wall of the mold controls the thickness of the bottom wall of the injection molded article. In addition, it will be apparent that any shifting of the core pin in the X and Y planes will result in a variation of sidewall thickness of the molded article.

In view of the foregoing, there are provided means wherein the core pin may be accurately adjusted in the X, Y, and Z planes relative to a support for the core pin.

In one form of the invention, for example with a manually loaded machine, the core pin is seated on the head of a headed screw which is adjustably threaded into a support for adjusting the core pin along its Z axis. A base portion of the core pin is provided with flats at right angles to one another and the same support is provided with two other headed screws adjustably threaded into the support, the two other headed screws being disposed at right angles to one another and lying in a plane normal to the Z plane for shifting the core pin in the X and Y planes, the heads of these two other threaded screws engaging the flats on the core pin base portion. A suitable clamp forces the base portion of the core pin against the heads of the three threaded screws.

In another form of the invention, for example in an automatic machine which includes a toggle assembly to raise and lower the core pin, the core pin is adjusted in the X and Y planes by means of a guide ring which is adjustably mounted in a plane normal to the Z plane. The core pin is slidably mounted in the guide ring for movement along the Z axis. The toggle linkage is movable along the Z axis by means of a turn buckle arrangement to provide core pin adjustment in the Z plane.

Another feature of the invention is the forming of the mouth portion of the mold or in the case of a neck ring, if a neck ring is provided, with a clearance between the mouth and the core rod such that the radial clearance and the length of such clearance permits angular displacement of the core rod relative to the mold or neck ring without flashing of the plastics material occurring.

When the mounting of the core pin or rod includes a guide ring for permitting the axial shifting of the core pin relative to the mold, the guide ring is positioned in spaced relation with respect to the mold mouth a considerable distance in comparison with the length of the core pin proper or the molded article so that there is an adjustment ratio on the order of approximately four to one so as to provide for a very fine adjustment of the position of the core pin in the mold in the X and Y planes.

With the above and other objects in view that will hereinafter appear, the nature of the invention will be more clearly understood by reference to the following detailed description, the appended claims and the several views illustrated in the accompanying drawings.

In the drawings,

FIG. 1 is a schematic elevational view showing a core pin mounted on a support for positioning relative to an injection mold in accordance with this invention.

FIG. 2 is a fragmentary transverse sectional view taken along the line 2—2 of FIG. 1 and shows more specifically the adjustable mounting of the core pin.

FIG. 3 is a fragmentary sectional view through a modified form of mold construction and shows the relationship of the mold with respect to the core pin.

FIG. 4 is an enlargement of a modification of the mold of FIG. 3.

FIG. 5 is a schematic sectional view through another form of mold assembly including a toggle assembly which positions the core pin relative to an associated mold along the axis of the core pin, there being illustrated a modified form of means for adjusting the position of the core pin in the X, Y, and Z planes.

FIG. 6 is a fragmentary transverse sectional view taken along the line 6—6 of FIG. 5 and shows the specific mounting of a guide ring for the core pin.

FIG. 7 is an enlarged fragmentary longitudinal sectional view taken along the lines 7—7 of FIG. 5 and shows the specific mounting of the base portion of the core pin relative to a support therefor.

FIG. 8 is an enlarged fragmentary elevational view showing the manner in which adjusting screws for the guide ring are accurately adjusted.

FIG. 9 is a schematic sectional view taken along line 9—9 of FIG. 5 wherein the toggle assembly is in the closed or up position.

FIG. 10 is a schematic sectional view similar to FIG. 9 but with the mold removed and wherein the toggle assembly is in the open or down position.

Referring now to the drawings in detail, it will be seen that there is illustrated in FIGS. 1 and 2 an injection mold assembly for a manually loaded machine which includes a partable injection mold 10 in which an article 11 is injection molded in a conventional manner through the usual sprue opening 12. The illustrated injection mold 10 is configurated for molding a tubular parison for a container which includes a threaded neck finish 13. For convenience of handling the parison 11 the mold 10 is provided with a split neck ring 14.

Cooperable with the mold 10 and the neck ring 14 for the forming of the article 11 is a core rod generally identified by the numeral 15. The core rod 15 includes a core rod proper 16 and a base portion 17.

It will be readily apparent that the relative position of the core rod proper 16 within the mold 10 and the neck ring 14 will determine the sidewall thickness of the article 11 as well as the bottom wall thickness. Further, it is to be understood that a seal must be effected between the mold and the core rod proper 16 in order to prevent the plastics material injecting into the mold 10 from extruding out of the open end of the mold. Accordingly, the neck ring 14 is provided with a bore 18 receiving the core rod with a clearance C between the wall of the opening 18 and the core rod proper 16. The axial dimension of the opening 18 is of a length L. It is to be understood that the dimensions C and L are critical. The clearance C is such that flashing will not occur, but is of sufficient magnitude to allow required angular displacement of the core rod for centering of the core rod within the mold 10. The pivoting is permitted because the dimension L is relatively short. More specifically, the dimensions C and L are selected so that angular displacement of the core rod is possible without flashing through the opening 18 around the core rod.

In FIGS. 1 and 2 there is specifically illustrated the mounting for the core rod 15 which permits the adjustment thereof. First of all, it is to be noted that the core rod 15 is carried by a support 21 having an opening 22 therein for receiving the extreme end of core rod base portion 17. The base portion 17 has a flat end 23 which is seated on a head 24 of a screw element 25 which is adjustably threaded into an internally threaded bore 26 in the support 21. It will be seen that by adjusting the threaded element 25 the core rod 15 may be shifted in a Z plane along its Z axis so as to adjust the position of the end of the core rod relative to the bottom wall of the mold 10, thus controlling the thickness of the bottom wall.

The support 21 also carries threaded screw elements 27 and 28 for varying the X and Y axes of the core rod 15. The screw element 27 is provided with a head 29 which is seated against a flat 30 formed on the side of the base portion 17. The screw element 27 is adjustably threaded in an internally threaded bore 31 in the support 21.

The screw element 28 also has a head 32 which engages a flat 33 on the side of the core element 15 and the screw element 28 is adjustably threadedly engaged in a threaded bore 34 in the support 21. It is to be noted that the screw elements 27 and 28 are disposed at right angles to one another and lie in a plane which is perpendicular to the Z plane. It is also to be noted that the flats 30, 33 are disposed at right angles to one another.

The base portion of the core rod 15 is provided with a further flat 35 which is disposed in equal angular relation to the flats 30, 33 and generally oppose the same. A head of a suitable clamping means 36 engages the flat 35 and serves to force the flats 30 and 33 against their respective screw heads 29 and 32, and to clamp the core rod 15 in place with respect to the head 24 of the screw 25. It is to be understood that the clamping means 36 will be released when any of the fastener elements are to be adjusted so as to adjust the core rod or pin 15 in any of the X, Y, and Z planes. For descriptive purposes only, the screw element 27 may be considered as defining the X axis while the screw element 28 defines the Y axis.

In FIG. 3 there is illustrated a slightly modified form of mold construction. While the mold 10 may remain the same and the molded article 11 will be the same, the neck ring is of a different construction. Instead of the neck ring being of a simple split construction, the neck ring, which is identified by the numeral 37, may include a split outer part 38 and a one-piece sleeve 39. The sleeve 39 will allow the molding of the top or end of the neck finish without a parting line seam.

Reference is now made to FIG. 4 wherein an enlargement of a preferred form of the sleeve 39 is shown. It is to be noted that the sleeve 39 has a recess 40 formed in the end thereof so that the sleeve 39 has an inner portion 41 which enters into the molded article 11 by a small amount. With this type of construction it is possible to mold a radius on the internal diameter of the neck finish 13, as is specifically illustrated at 42.

Reference is now made to FIGS. 5-10 wherein a mold assembly for an automatic machine is illustrated. For descriptive purposes, it is to be understood that the mold assembly will be operable to mold an article or parison 11 in the manner illustrated in FIGS. 1 and 3. The mold assembly will include a split mold 10 having a split neck ring 14 or, if desired, the neck ring may be constructed in the manner shown in FIG. 3. Associated with the mold 10 and the neck ring 14 is a core rod or pin 45 which will correspond generally to the core rod 15, but will be of different dimensions. For example, the core rod proper 46 is illustrated as being longer and proportionately thinner, and the same is also true of the base portion 47 thereof.

While no reference was made with respect to the arrangement of FIG. 1 to a machine frame, it is to be understood that each mold apparatus includes a machine frame and such machine frame is identified by the numeral 48 in FIG. 5. The mold 10 and the neck ring 14 are suitably supported by the machine frame 48 in a conventional manner not illustrated here.

The machine frame 48 has extending downwardly from an upper section thereof a support structure generally identified by the numeral 49. The support structure 49 includes a mounting ring 50 which is secured to the underside of the machine frame 48 by suitable screws, such as the screw 51.

The support assembly 49 includes a lower support 52 which corresponds to the support 21. The support is suspended from the ring 50 by means of a support member 53.

The support 52 carries a pivot shaft 54 which pivotally mounts a support element 55, which, in turn, carries a threaded fastener element 56. Element 56 is part of a turn buckle, generally identified by the numeral 57, which turn buckle assembly 57 includes another threaded fastener element 58 and a sleeve 59. The threads of the fastener elements 56, 58 are of a different hand and the opposite end portions of the sleeve 59 are also internally threaded with threads of a different hand so that rotation of the sleeve 59 will result in the selective separation or bringing together of the fastener elements 56, 58. The fastener elements 56, 58 are also provided with suitable lock nuts 60.

It is to be noted that the fastener element 58 carries a lower portion of a conventional toggle assembly, generally identified by the numeral 61. The toggle assembly 61 includes component 62 which is carried by element 58. An actuator 63 is secured to a pivot shaft 64 journalled in the part 62. The pivot shaft 64 is mounted with respect to an upper part 65 so that an opening movement of the actuator 63 results in the downward movement of the upper part 65. The support assembly includes an elongated sleeve 66 which depends from the ring 50. The sleeve 66 has guidably mounted in the lower part thereof the upper part 65. Part 65 also includes a transverse support bar 67 which, in turn, carries the core rod or pin 45.

As best illustrated in FIG. 7, it will be seen that the extreme lower end of the base portion 47 of the core rod 45 is provided with an adapter 68 which is threadedly connected thereto by an extension 69 of the adapter which is threaded into the end of the base portion 47. The adapter 68 has a lower end portion 70 of a reduced diameter and this lower end portion 70 is freely positioned in a bore 71 in the upper portion of the support bar or arm 65. A lower bore portion 72 of a lesser diameter is in direct communication with the bore portion 71. Finally, the underside of the support arm 65 is provided with a recess 73 aligned with the bores 71, 72.

A fastener 74 passes through the bores 71, 72 and is threaded into the lower portion 70. The fastener 74 has a head which engages a washer 75 seated in the recess 73 so as to draw the adapter 68 towards the support arm 65.

The upper surface of the support arm 65 is provided with a recess 76 in which there is seated a washer 77 having a bevelled upper surface. Seated on the washer 77 is another washer 78 having a bevelled undersurface meeting with the bevelled upper surface of the washer 77. If necessary, the mating surfaces of the washers 77, 78 could be part spherical.

As apparent from FIG. 7, fastener 74 has sufficient clearance to slide sidewise relative to the support arm 65 generally in a plane disposed perpendicular to the longitudinal axis (Z axis) of the core rod 45 to permit lateral and angular motion. Thus, the adapter 68 and the associated core rod 45 may be shifted in the X and Y planes so as to vary the X and Y axes of the core rod 45.

The support assembly 49 also includes a guide ring 80. The guide ring 80 is provided with a bushing 81 which snugly receives the base portion 47 so as to guide the core rod 45 when it is axially shifted along the Z axis. The guide ring 80 is adjustable in a plane normal to the Z axis and to facilitate the mounting thereof it is provided with an external angular groove.

Referring most specifically to FIGS. 5 and 6, it will be seen that the sleeve 66 is provided with a pair of axially extending arms 83. Each arm 83 is provided with an internally threaded bore 84 through which a threaded screw element 85 extends. Each screw element 85 is provided with a reduced diameter end portion 86 which is received in the groove 82.

Each screw element 85 is provided with a head 87 to facilitate the rotation thereof and, thus, the radial adjustment thereof relative to the respective arm 83. In order to accurately position each screw element 85 and thus accurately position the guide ring 80, there is provided a dial plate 88 behind the head 87 with the dial plate being secured in a fixed position relative to the head 87 by means of a locknut 89. Each screw element 85 also includes a locknut 90 to lock it in an adjusted position with respect to its respective arm 83. A suitable pointer 91 is carried by each arm 83 in association with the dial plate 88, as is best shown in FIG. 8, for the purpose of effecting a fine adjustment of the guide ring 80.

It is noted that associated with the mold 10 is a plate 92 carried by the machine frame 48. The plate 92 is provided with an insert ring 93 having a bore 94 therethrough for the passage of the core rod proper 46. It is to be understood that the normal clearance of the core rod within the bore 94 is on the order of 0.010–0.020 inch, with the core rod or pin 45 being held in rough alignment with the mold by the adapter ring 93. This clearance allows for rough alignment of the core rod with the mold when the mold is open, but will not influence the position of the core rod when the mold 10 is closed.

It is to be noted that the alignment mechanism for the core rod 45 is located in a position to give approximately a four to one ratio of parison length to adjusting position length which allows for small and very accurate changes in the parison wall thickness. These changes are made by adjusting the fine threaded screw elements 85 in the X and Y planes.

As seen best in FIGS. 9 and 10, the toggle linkage permits the core pin to be removed from the parison. As apparent when the toggle linkage is in the closed or up position, the "Z" adjustment can be made with turn buckle assembly 57 to control the thickness of the parison bottom.

Although several embodiments of the invention have been specifically illustrated and described herein, it is to be understood that minor variations may be made in the core rod mounting and the relationship of the core rod to the mold without departing from the spirit and scope of the invention as defined by the appended claims.

It is claimed:

1. Mounting apparatus for mounting a core pin relative to an associated parison mold for forming plastic containers, said mold having a substantially closed end and said core pin fitting into said mold so as to form a closed end on a parison, said core pin having X, Y, and Z axes, said mounting apparatus comprising a support unit, and adjusting means for selectively adjusting the position of said core pin in a respective plane of each of said axes relative to said support.

2. The apparatus of claim 1 wherein said core pin is associated with a mold having a mouth, said core pin in its operative position extending into said mold through said mouth, and said core pin in conjunction with said mold having a pivot point along each of said X axis and said Y axis adjacent said mold mouth.

3. The apparatus of claim 1 wherein said adjusting means includes a plurality of individually adjustable threaded elements.

4. The apparatus of claim 1 wherein said adjusting means for said Z axis includes a headed threaded member extending along said Z axis and adjustably threaded into said support unit, and said core pin having an end seated on said threaded member head.

5. The apparatus of claim 1 wherein said adjusting means for adjusting said core pin in said X and Y planes include headed threaded members extending from said support unit at right angles to each other and to said Z axis, said threaded members being adjustably threaded into said support unit with heads thereof engaging said core pin.

6. The apparatus of claim 5 wherein said core pin has flats thereon dispersed parallel to said Z axis and at right angles to each other, and said flats engaging respective ones of said threaded member heads.

7. The apparatus of claim 4 wherein said adjusting means for adjusting said core pin in said X and Y planes include headed threaded members extending from said support unit at right angles to each other and to said Z axis, said threaded members being adjustably threaded into said support unit with heads thereof engaging said core pin.

8. The apparatus of claim 2 wherein said mold includes a neck ring at said mold mouth, and said pivot points being generally a common point defined by a close clearance between said neck ring and said core pin.

9. The apparatus of claim 2 wherein said pivot points are defined by a close clearance between said core pin and a surrounding portion of said mold.

10. The apparatus of claim 1 wherein said support unit includes a support member; said X and Y axes adjusting means including cooperating self-aligning spacer means between a base end of said core pin and said support member, and receiving means clamping said core pin end in X and Y planes adjusted position relative to said support member.

11. The apparatus of claim 1 wherein said X and Y planes adjusting means includes a guide ring, said guide ring being fixed along said Z axis, and said core pin having a base portion slidable through said guide ring in said Z plane.

12. The apparatus of claim 11 wherein threaded fasteners are adjustably carried by said support unit, said threaded fasteners generally intersecting said Z axis and functioning as both support and positioning means for said guide ring.

13. The apparatus of claim 12 together with indicator means for determining the adjusted position of each threaded fastener.

14. The apparatus of claim 11 wherein said support unit includes a support member mounted for movement along said Z axis, the base of said core pin being seated relative to said support member for movement therewith, and securing means between said core pin base and said support member facilitating shifting of said core pin base relative to said support member in a plane normal to said Z axis.

15. The apparatus of claim 14 wherein said support unit includes a positioning device for moving said core pin and said support member in said Z plane, and said Z plane adjusting means includes an adjustable connection between said positioning device and other portions of said support units.

16. The apparatus of claim 11 together with means for moving said core pin through said guide ring along said Z axis and said Z plane adjusting means includes an adjustable connection between said positioning device and other portions of said support units.

17. The apparatus of claim 1 wherein said adjusting means for said Z plane includes aligned spaced threaded members of opposite thread direction and a coupling sleeve having opposite ends threaded onto said threaded members for selectively adjusting the spacing between said threaded members.

18. The apparatus of claim 1 wherein said adjusting means for said Z plane includes aligned spaced threaded members of opposite thread direction and a coupling sleeve having opposite ends threaded onto said threaded members for selectively adjusting the spacing between said threaded members, one of said threaded members being connected to said support unit and there being a toggle linkage between the other of said threaded members and said core pin.

19. The apparatus of claim 11 wherein there is a guide bushing for said core pin spaced from said guide ring and adapted to be positioned adjacent a cooperating mold, and the spacing of said guide bushing from said guide ring being materially greater than the length of the core pin proper.

20. The apparatus of claim 1 together with a mold having a mouth receiving said core pin, said mouth being cylindrical and of a preset axial length with there being a radial clearance between said mold mouth and said core pin, the relative dimensions of said axial length and radial clearance being such as to prevent plastics material flash from passing through said mouth around said core pin while permitting adjustment of said core pin in X and Y planes.

21. The apparatus of claim 20 wherein said mouth generally defines a pivot for said core pin in said X and Y planes.

22. The apparatus of claim 8 wherein said neck ring includes a split outer part in conjunction with a one-piece inner sleeve.

23. The apparatus of claim 22 wherein said sleeve includes a recess formed in an end thereof.

* * * * *